United States Patent [19]

Okumura et al.

[11] 4,144,559
[45] Mar. 13, 1979

[54] POWER CONVERTER CONTROL SYSTEM

[75] Inventors: Yoshio Okumura, Katsuta; Kyozo Tachibana, Naka; Hiroshi Sato, Katsuta; Genichi Matsumoto, Hitachi, all of Japan

[73] Assignee: Hitachi, Ltd., Japan

[21] Appl. No.: 829,476

[22] Filed: Aug. 31, 1977

[30] Foreign Application Priority Data

Sep. 6, 1976 [JP] Japan ............................. 51/105794

[51] Int. Cl.² ........................................ H02M 7/155
[52] U.S. Cl. ...................................... 363/88; 363/68; 318/800; 318/345 G
[58] Field of Search ............... 318/227, 345 C, 345 G; 363/67, 68, 85, 88

[56] References Cited

U.S. PATENT DOCUMENTS

| 4,020,411 | 4/1977 | Tsuboi et al. | 363/68 |
| 4,030,018 | 6/1977 | Tsuboi | 363/68 |

Primary Examiner—William M. Shoop
Attorney, Agent, or Firm—Craig & Antonelli

[57] ABSTRACT

A power converter control system for use with a power converter of the type which comprises a plurality of cascade-connected converter units of which at least one converter unit is subjected to continuous control of its conduction phase angle and the remaining converter units are subjected to on-off control of their conductivity is arranged to include a master controller for instructing the number of the converter units to be rendered operative, a reversible counter operative to change its content in response to a phase controlling command applied to the continuously controlled converter unit indicating a maximum or minimum conduction phase angle or delayed phase angle in conduction, a unit change control unit for producing unit changing operation signals to be applied to the respective converter units for controlling the operation of the same, by using one of the binary bits derived from the counter without modification and decoding the remaining bits, and a comparing and identifying circuit which compares the content of the reversible counter with the output of the master controller and causing the reversible counter to operate in response to the aforementioned phase control command until the content of the same becomes identical to the output of the master controller.

5 Claims, 5 Drawing Figures

POWER CONVERTER CONTROL SYSTEM

BACKGROUND OF THE INVENTION

This invention relates to an improvement of the power converter control system for use with a power converter comprising a plurality of rectifier units for converting AC current into DC current.

This type of power converter is suitable for AC electric locomotives as disclosed in, for example, "Brown Boveri Review", December 1973, especially pages 526 to 538 and FIGS. 6 and 7. In such a power converter, in order to prevent an adverse affect upon communication equipment and the like due to high frequency currents of harmonics flowing through the AC section, the DC output section is arranged by a plurality of rectifier units connected in cascade wherein one of the rectifier units is subjected to continuous control of its conduction phase angle and the other rectifier units are subjected to on-off control in their conductivity so that the DC output voltage of the power converter is continuously controlled by a conbination of the continuously controlled rectifier unit and selected ones of the on-off controlled rectifier units.

One example of a circuit for digitally producing changing operation signals applied to the respective rectifier units has been proposed in Japanese patent application No. 81,120/1974 filed on July 17, 1974 and laid open to public on Jan. 27, 1976 as Japanese patent laid open specification No. 10,348/1976.

According to the laid open specification, the changing operation signals applied to the respective rectifier units are produced in the following manner.

Fist, a count output of a reversible counter, which changes the content of count when a phase control-command applied to the continuously controlled rectifier unit reaches a value indicating a maximum or minimum conduction phase angle, is converted into a decimal code by means of a decoder. On the other hand, an output of a master controller indicative of the number of the rectifier units to be operated is compared with the output of the decoder in a comparing and identifying circuit and the content of count of the reversible counter is changed such that both the outputs become identical with each other. By taking into consideration of both the decimal code output converted from the decoder and output of the comparator circuit, changing operation signals to be applied to the respective rectifier units are produced by code-conversion by a code converter.

Thus, the code converter requires a large number of inputs for producing the changing operation signals applied to the respective rectifier units, resulting in complexity of circuit and increase in fabrication process responsible for inefficiency.

SUMMARY OF THE INVENTION

A principal object of this invention is to provide an improved control system for a power converter of the type comprising a continuously controlled rectifier unit and on-off controlled rectifier units. Specifically, this invention contemplates to incorporate the control system with a simplified circuit for producing the changing operation signals applied to the respective rectifier units.

According to one aspect of this invention, a binary coded output of a reversible counter is compared with an instruction, in the form of a binary code, indicative of the number of rectifier units to be rendered operative and represented by the notch position of a master controller wherein an output of the first bit in the content of the reversible counter is used for one of the unit changing operation signals without modification and the remaining bits are subjected to code-conversion for producing the remaining ones of the unit changing operation signals.

DESCRIPTION OF THE PREFERRED EMBODIMENTS

Figure 1:
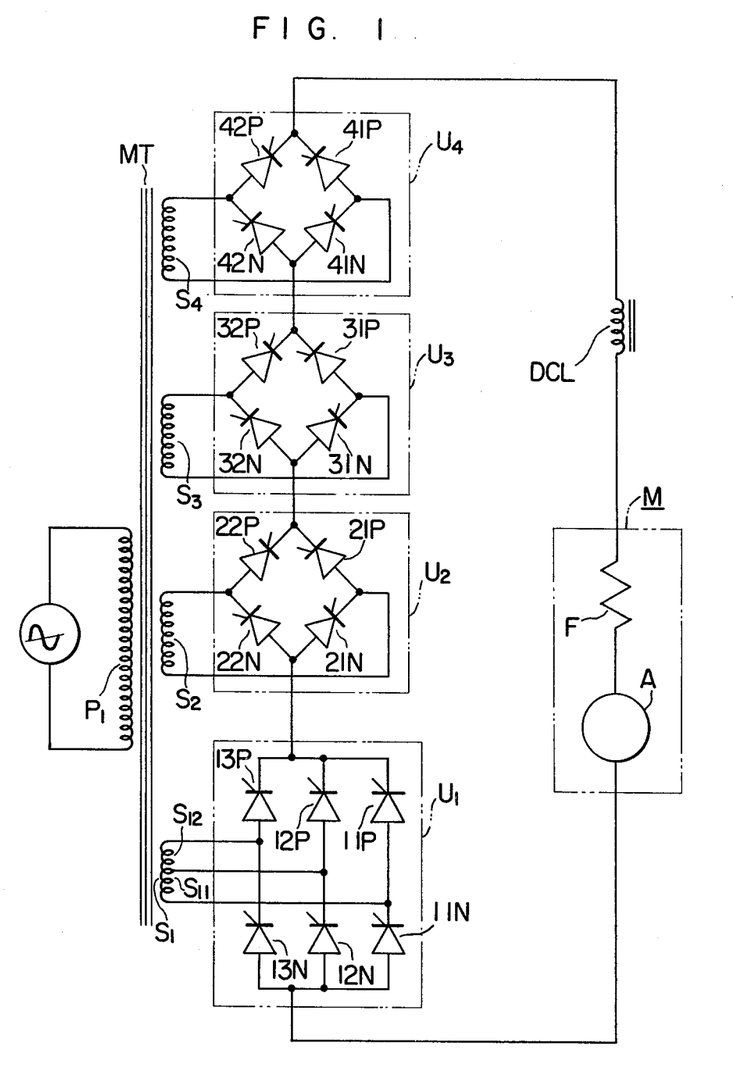
FIG. 1 is a schematic circuit diagram of a principal circuit of a power converter to which the invention is applied.

Referring first to FIG. 1, a principal circuit arrangement of a power converter to which the invention is applied will be explained.

A main transformer MT as illustrated in FIG. 1 has a primary winding $P_1$ connected to a single phase AC power supply and a secondary winding assembly divided into windings $S_1$ to $S_4$ which are respectively connected to rectifier units $U_1$ to $U_4$ to be described later. The secondary winding $S_1$ with a center tap is connected to the rectifier unit $U_1$ which includes thyristors 11P, 12P, 13P, 11N, 12N and 13N connected in a three-phase bridge configuration. The secondary winding $S_2$ is connected to the rectifier unit $U_2$ including thyristors 21P, 22P, 21N and 22N connected in a bridge configuration, the secondary winding $S_3$ to the rectifier unit $U_3$ including thyristors 31P, 32P, 31N and 32N connected in a bridge configuration, and the secondary winding $S_4$ to the rectifier unit $U_4$ including thyristors 41P, 42P, 41N and 42N also connected in a bridge configuration. These secondary windings respectively share the total secondary AC voltage at ratios of $$S_{11}:S_{12}:S_2:S_4 = 1:1:1:2:2:2$$

where $S_{11}$, $S_{12}$ represent two divisions of the secondary winding $S_1$ with respect to the center tap.

DC output sections of the rectifier units $U_1$ to $U_4$ are connected in series to form a cascade configuration. These rectifier units $U_1$ to $U_4$ constitute a single power converter, the DC output current of which is smoothed by a smoothing reactor DCL and then fed to a DC series motor M comprising an armature A and a field winding F.

In the rectifier units $U_1$ to $U_4$, the unit $U_1$ is used as the one which is subjected to continuous control and the remaining units $U_2$ to $U_4$ are used as the other ones which are subjected to one-off control.

While the thyristors 11P and 11N of continuously controlled rectifier unit $U_1$ operate in a mode of diode, other thyristors 12P, 12N, 13P and 13N operate each with a controllable phase lag in conduction which changes continuously in accordance with a phase controlling command from a phase shifter as described later. This rectifier unit $U_1$ first operates with thyristors 11P, 11N, 12P and 12N connected in a single phase bridge circuit. Namely, the single phase bridge circuit is supplied with the voltage division $S_{11}$ of secondary winding $S_1$ and the controllable lag angle $\alpha$ for the thyristors 12P and 12N is controlled continuously from a maximum phase lag (180°) to a minimum phase lag (0°). When the controllable lag angle $\alpha$ reaches the minimum phase, the thyristors 11P, 11N, 12P and 12N form a so-called full wave rectifier circuit.

Thereafter, with the controllable lag angle $\alpha$ for thyristors 12P and 12N maintained at the minimum phase, the controllable lag angle $\alpha$ for thyristors 13P and 13N is continuously controlled from the maximum phase lag to the minimum phase lag. At this time, the DC output voltage of rectifier unit $U_1$ is equal to the sum of a voltage resulting from the full wave rectification of the AC voltage across the winding $S_{11}$ and a voltage resulting from the rectification of the AC voltage across the winding $S_{12}$ in accordance with the controllable lag angle for thyristors 13P and 13N.

In contrast, the on-off controlled rectifier units $U_2$ to $U_4$ each operate, on the one hand, as a full wave rectifier circuit, when being rendered on-state, to provide a DC output voltage corresponding to a full wave rectified voltage and on the other hand, when these rectifier units are rendered off-state, the thyristors 21P, 21N, 31P, 31N, 41P and 41N operate in the mode of diode while the thyristors 22P, 22N, 32P, 32N, 42P and 42N are non-conductive so that the rectifier units $U_2$ to $U_4$ provide no DC output voltages.

It will be appreciated that although the rectifier units $U_1$ to $U_4$ are shown to be constituted by thyristors in order to operate the units not only in a rectifier mode, but also in an inverter mode, they may be constituted, if merely required to operate in the rectifier mode, by a mixed bridge connection of thyristors and diodes, in which diodes may be substituted for thyristors 11P, 11N, 21P, 21N, 31P, 31N, 41P and 41N of the rectifier units $U_1$ to $U_4$.

Figure 2:
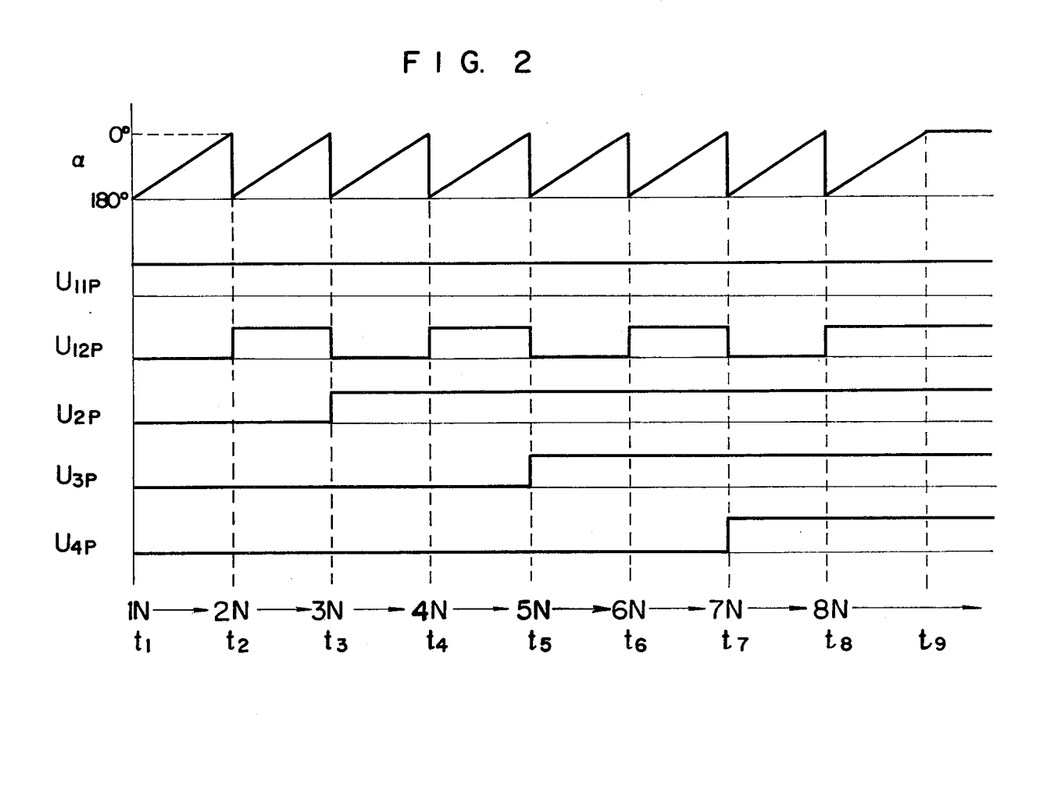
FIG. 2 is a waveform diagram useful to explain the operation of the circuit shown in FIG. 1.

Turning now to FIG. 2, the operation of the principal circuit of FIG. 1 will be described. As diagrammatically shown in FIG. 2, waveforms $U_{11P}$ and $U_{12P}$ are operation signals applied to the continuously controlled rectifier unit $U_1$ and more particulary the waveform $U_{11P}$ is of an operation signal applied to the single phase bridge circuit of thyristors 11P, 11N, 12P and 12N when the system is rendered operative and the waveform $U_{12P}$ is of a changing operation signal applied to the thyristors 13P and 13N of the rectifier unit $U_1$ when the output voltage of the rectifier unit U is controlled by changing the phase lag of the thyristors 13P and 13N while maintaining the thyristors 12P and 12N at the minimum phase lag. Waveforms $U_{2P}$, $U_{3P}$ and $U_{4P}$ are unit changing operation signals applied to the on-off controlled rectifier units $U_2$, $U_3$ and $U_4$, respectively.

The operation signal $U_{11P}$ is always applied to the rectifier unit $U_1$ when the system is operating and the changing operation signal $U_{12P}$ is applied to the rectifier unit $U_1$ in response to each of the notch commands 2N, 4N, 6N and 8N which are produced by a master controller as mentioned hereinafter in detail, while the unit changing operation signal $U_{2P}$ continuously applied to the rectifier unit $U_2$ with the notch commands 3N and succeeding thereto, the unit changing operation signal $U_{3P}$ is continuously applied to the rectifier unit $U_3$ with the notch commands 5N and succeeding thereto and the unit changing operation signal $U_{4P}$ is continuously applied to the rectifier unit $U_4$ with the notch commands 7N and succeeding thereto.

With the notch command 1N, the operation signal $U_{11P}$ is applied to the rectifier unit $U_1$ and the controllable lag angle $\alpha$ for thyristors 12P and 12N is continuously controlled, in a manner as described hereinafter, from the maximum phase lag (180°) to the minimum phase lag (0°). When this controllable lag angle $\alpha$ reaches the minimum phase lag and the notch command 2N is given, the operation signal $U_{12P}$ is applied, in addition to the operation signal $U_{11P}$, to the rectifier unit $U_1$ whereby the controllable lag angle of the thyristors 12P and 12N is maintained at the minimum phase lag, while the controllable lag angle $\alpha$ for thyristors 13P and 13N is continuously controlled from the maximum phase lag to the minimum phase lag. With this controllable lag angle $\alpha$ for thyristors 13P and 13N reaching the minimum phase and the notch command 3N, the unit changing operation signal $U_{2P}$ is applied to the rectifier unit $U_2$ to render it on-state so that the rectifier unit $U_2$ shares a DC output voltage equal to the maximum or eventual output of the rectifier unit $U_1$, while the DC output voltage of rectifier unit $U_1$ is returned to zero and the operation signal $U_{11P}$ still applied to the rectifier unit $U_1$, acts in the same manner as with the notch command 1N, thereby again repeating the continuous control of the controllable lag angle $\alpha$ for thyristors 12P and 12N from the maximum phase to the minimum phase. When the controllable lag angle $\alpha$ for thyristors 12P and 12N reaches the minimum phase with the notch command 3N and then the notch command 4N is given, the operation signal $U_{12P}$ is again applied to the rectifier unit $U_1$. Further, when the total DC output voltage of rectifier unit $U_1$ reaches the maximum value (at the minimum phase lag or controllable lag angle for thyristors 13P and 13N, with the notch command 4N and then the notch command 5N is given, the unit changing operation signal $U_{3P}$ is applied to the rectifier unit $U_3$, thereby rendering it on-state. Consequently, the rectifier unit $U_3$ thus turned on shares a DC output voltage equal to the maximum DC output of the rectifier unit $U_1$.

A similar operation is repeated for notch commands 6N to 8N and hence the DC output voltage fed to the DC motor M is increased continuously.

Figure 3:
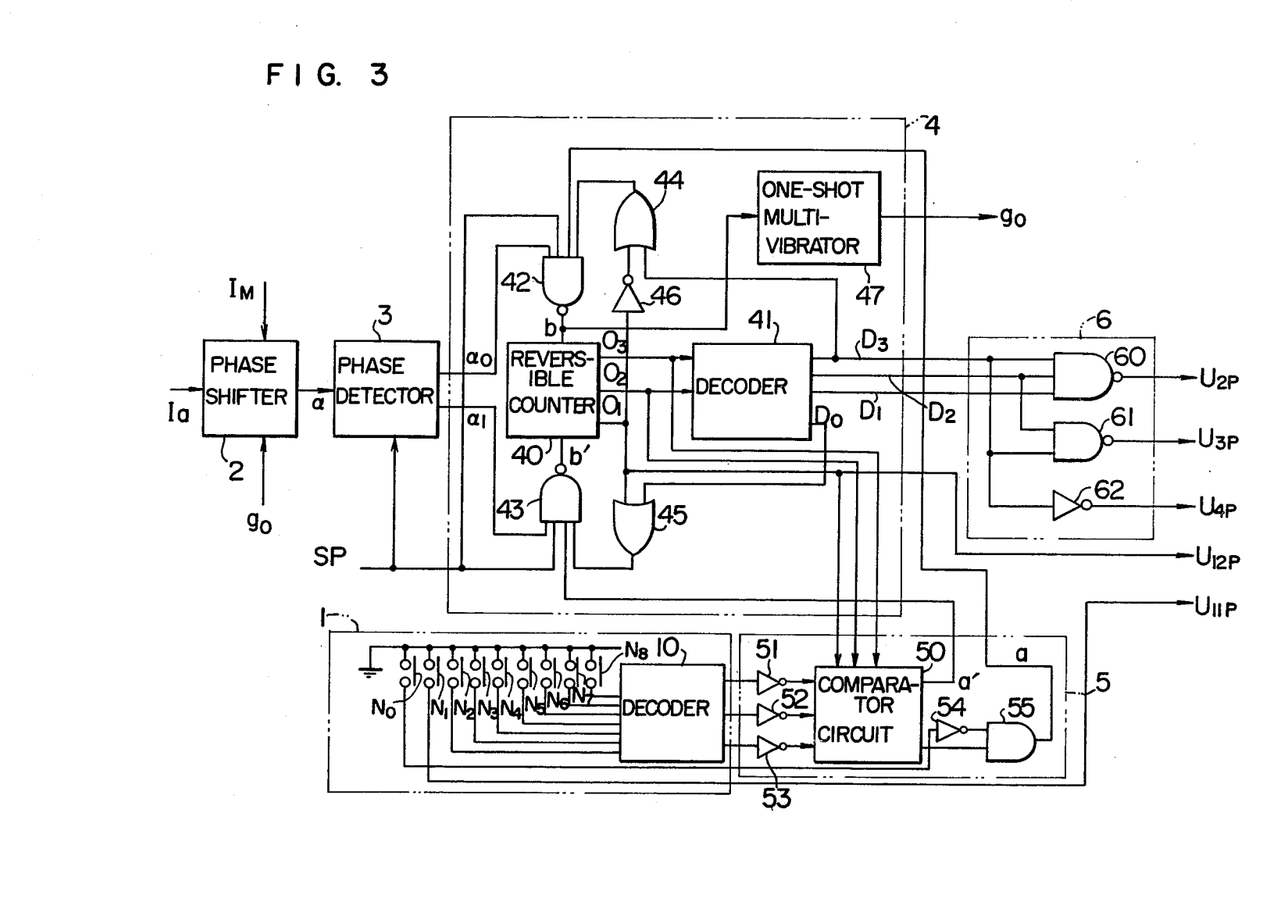
FIG. 3 is a circuit diagram of a unit changing control circuit embodying the invention.

Referring now to FIG. 3, a unit change control circuit will be described which produces operation signals $U_{11P}$, $U_{12P}$, $U_{2P}$, $U_{3P}$ and $U_{4P}$ to be applied to the rectifier units.

A master controller 1 is shown in FIG. 3 to have contacts $N_0$ to $N_8$ and a decoder 10. The master controller further includes a manual operating mechanism (not shown) for operating the contacts $N_1$ to $N_8$, in a manner as described hereinafter, thereby producing signals corresponding to the notch commands 1N, 2N, ... 8N, successively. The contact $N_o$, a normally-closed contact, is provided for detecting power failure and in application to the power converter for electric locomotives, it is opened with the absence of the supply line voltage which occurs, for example, when the pantograph removes from the supply line or the locomotive runs on an isolating section of the route where the power supply system is changed from one to another.

The contacts $N_1$ to $N_8$ are normally closed and selectively opened according to the respective notch commands given by the manual operating mechanism. With the notch command 1N, the contact $N_1$ is opened; with notch command 2N, the contacts $N_1$ and $N_2$ are opened; with notch command 3N, the contacts $N_1$, $N_2$ and $N_3$ are opened; . . .; and with notch command 8N, the contacts $N_1, N_2, \ldots, N_8$ are opened.

The closed-state of these contacts $N_0$ to $N_8$ corresponds to a logic "0" and the opened-state to a logic "1".

The decoder 10 receives input signals representative of the states of contact $N_2$ to $N_8$ and delivers three outputs in the form of a binary code. A signal respresentative of the state of contact $N_1$ is used as the operation signal $U_{11P}$ without modification because the operation signal $U_{11P}$ is required to occur for all the notch commands, as shown in FIG. 2, and the contact $N_1$ which is opened in common to all the notch commands meets this requirement.

A phase shifter 2 compares a motor current $I_M$ flowing through the DC motor M shown in FIG. 1 with a current command Ia indicative of a predetermined value of the motor current and instructs the controllable lag angle $\alpha$ for thyristors of the continuously controlled rectifier unit $U_1$ such that the motor current $I_M$ approaches to the command current Ia. The command current Ia is usually determined to be equal to the upper limit of the motor current at the normal running thereof so that the lag angle $\alpha$ reaches the maximum or minimum value before the motor current $I_M$ reaches the command current Ia. The phase shifter 2 may take the form of a magnetic phase shifter or a semiconductor phase shifter.

A phase detector circuit 3 is provided to detect the minimum phase lag ($\alpha_o$) or the maximum phase lag ($\alpha_1$) of output $\alpha$ from the phase shifter 2. When detecting the minimum phase lag $\alpha_o$, the phase detector circuit delivers a signal which causes the content of a reversible counter 40 in a unit change control circuit 4, as described later, to be increased and when detecting the maximum phase lag $\alpha_1$, the phase detector circuit delivers a signal when causes the content of the reversible counter 40 to be decreased. The unit change control circuit 4 operates to change the number of the rectifier units to be operated. This phase detector circuit 3 will be described in move detail with reference to FIG. 4. As shown therein, the phase detector circuit 3 comprises one-shot multivibrator circuits 31 to 34, an inverter gate 35 and AND-gates 36 and 37. The one-shot multivibrator circuits 31 and 32 receive a synchronizing pulse SP which is produced in synchronism with each zero potential of the single phase AC power supply shown in FIG. 1. The one-shot multivibrator circuit 31 delivers a narrow width pulse output to the AND-gate 37 while the other one-shot multivibrator circuit 32 delivers a narrow width pulse output to the AND-gate 36 through the inverter gate 35. That is to say, the one-shot multivibrator 31 determines a timing for detecting the minimum phase lag $\alpha_o$ of the output $\alpha$ from phase shifter 2 and the one-shot multivibrator 32 serves to prevent an erroneous operation of the subsequenct one-shot multivibrator 33 which would occur when the output $\alpha$ of the phase shifter 2 exceeds the minimum phase lag $\alpha_1$.

Figure 4:
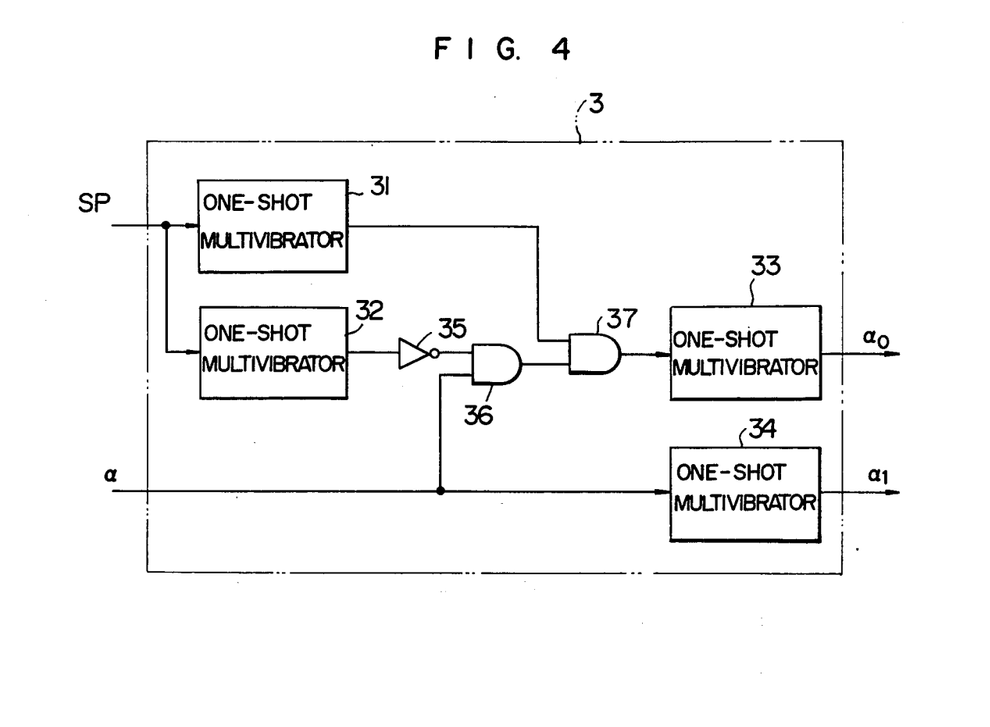
FIG. 4 is a detailed diagram of a part of the circuit shown in FIG. 3.

The minimum phase lag $\alpha_o$ can be detected in such a manner that when the output $\alpha$ of the phase shifter 2 is changed from the maximum phase lag and reaches the minimum phase lag, both the outputs of AND-gate 36 and one-shot multivibrator 31 assume logic "1" so that the output of the AND-gate 37 changes from a logic "0" to "1", thereby causing the output of one-shot multivibrator 33 to change from a logic "0" to "1".

The maximum phase lag $\alpha_1$, on the other hand, can be detected by the one-shot multivibrator 34 receiving the output of the phase shifter 2.

The unit change control circuit 4 as shown in FIG. 3 comprises a reversible counter 40, a decoder 41, NAND-gate 42 amd 43, OR-gates 44 and 45, an inverter gate 46 and a one-shot multivibrator 47.

The reversible counter 40 has outputs of three bits, the first bit of which is used as the operation signal $U_{12P}$ without modification. Namely, the operation signal $U_{12P}$ is generated alternately in accordance with successive changes of the notch command, making it possible to use the first bit output of the reversible counter 40 without modification. Second and third bits $O_2$ and $O_3$ are delivered to the decoder 41. When receiving the bits $O_2$ and $O_3$, the decoder 41 converts them into binary code outputs $D_o$ to $D_3$. An output b of the NAND-gate 42 causes the content of the reversible counter 40 along with the minimum phase signal $\alpha_o$ from the phase shifter 3 to be increased whereas an output b' of the NAND-gate 43 causes the content of the reversible counter 40 along with the maximum phase signal $\alpha_1$ to be decreased. In other words, the count content of reversible counter 40 is increased through the NAND-gate 42 when the notch command from the master controller 1 increases successively and it is decreased through the NAND-gate 43 when the notch command decreases successively. When receiving an output of the inverter 46 which corresponds to an inverted signal of the first bit output of reversible counter 40 and the output $D_3$ of decoder 41, the OR-gate 44 prevents the count content of the reversible counter 40 from being increased. By receiving the first bit $O_1$ of reversible counter and the output $D_o$ of decoder 41, the OR-gate 45 prevents the count content of the reversible counter 40 from being increased. Irrespective of the notch up operation in which the notch command is changed from a lower value to a higher value and the notch-down operation in which the notch command is reversely changed, these OR-gates 44 and 45 stop the counting operation of the reversible counter whenever the notch command of the master controller 1 reaches the final notch, thereby preventing the operation signals to be applied to the respective rectifier units from being changed.

The one-shot multivibrator 47 receives the output b of NAND-gate 42 and delivers a gate interrupting signal go. This gate interrupting signal go operates, through circuits not shown, to rapidly return the phase signal of the phase shifter 2 to a signal indicative of the maximum phase lag from a signal indicative of the minimum phase lag.

A comparing and identifying circuit designated at reference numeral 5 compares a signal (in response to the notch command) corresponding to an output of the decoder 10 in the master controller 1, which has been inverted through respective inverter gates 51 to 53, with the respective first to third bit output $O_1$ to $O_3$ from the reversible counter 40. When the number represented by the notch command from the master controller 1 exceeds the content of the reversible counter, the comparing and identifying circuit delivers a signal a to the NAND-gate 42 through an AND-gate 55 so that the count content of the reversible counter 40 is increased until the number represented by the notch command coincides with the count content. Conversely, when the number represented by the notch command is smaller than the count content, the comparing and identifying circuit delivers a signal a' to the NAND-gate 43 so that the content of reversible counter is decreased until the number repesented by notch command coincides with the content content. It will be appreciated tht the AND-gate 55 receives, at one input, the output of the comparing and identifying circuit and, at the other input, a signal which corresponds to an inversion by the inverter gate 54 of the signal representative of the state of contact No. This is to say, on the condition that no power failure is present, the reversible counter 40 is allowed to increase its count content.

A code converter 6 comprises NAND-gates 60 and 61 and an inverter gate 62 and receives the outputs $D_1$ to $D_3$ of the decoder 41 to produce the operation signals $U_{2P}$, $U_{3P}$ and $U_{4P}$ for the on-off controlled rectifier units.

The following is a truth value table of the reversible counter 40, decoder 41 and operation signals with respect to the notch command from master controller 1.

|    |         | 1N | 2N | 3N | 4N | 5N | 6N | 7N | 8N |
|----|---------|----|----|----|----|----|----|----|----|
|    | $O_1$   | 0  | 1  | 0  | 1  | 0  | 1  | 0  | 1  |
| 40 | $O_2$   | 0  | 0  | 1  | 1  | 0  | 0  | 1  | 1  |
|    | $O_3$   | 0  | 0  | 0  | 0  | 1  | 1  | 1  | 1  |
|    | $D_0$   | 0  | 0  | 1  | 1  | 1  | 1  | 1  | 1  |
|    | $D_1$   | 1  | 1  | 0  | 0  | 1  | 1  | 1  | 1  |
| 41 | $D_2$   | 1  | 1  | 1  | 1  | 0  | 0  | 1  | 1  |
|    | $D_3$   | 1  | 1  | 1  | 1  | 1  | 1  | 0  | 0  |
|    | $U_{11P}$ | 1 | 1  | 1  | 1  | 1  | 1  | 1  | 1  |
|    | $U_{12P}$ | 0 | 1  | 0  | 1  | 0  | 1  | 0  | 1  |
|    | $U_{2P}$  | 0 | 0  | 1  | 1  | 1  | 1  | 1  | 1  |
|    | $U_{3P}$  | 0 | 0  | 0  | 0  | 1  | 1  | 1  | 1  |
|    | $U_{4P}$  | 0 | 0  | 0  | 0  | 0  | 0  | 1  | 1  |

Taking this table into mind, the opration of the circuit of FIG. 3 will be described with respect to the notch commands 1N to 8N.

When the master controller 1 delivers no notch command (that is, the notch is set off), the outputs a and a' both assume "0" so that the outputs b and b' of NAND gates 42 and 43 both assume "1", thereby prohibiting the operation of reversible counter 40. It should be noted that the reversible counter 40 changes its count content when its input b or b' changes from "1" to "0".

Then when the master controller 1 instructs the notch command 1N at time $t_1$ or FIG. 2, the operation signal $U_{11P}$ for thyristors 12P and 12N is applied to the rectifier unit $U_1$. On the other hand, a control input is fed to the phase shifter 2 by way of a separate circuit system and the controllable lag angle $\alpha$ for thyristors 12P and 12N is continuously controlled along with the operation signal $U_{11P}$ from the maximum phase lag (180°) to the minimum phase lag (0°) between times $t_1$ and $t_2$ of FIG. 2. As far as the notch command 1N is given, the comparing and identifying circuit 5 ceases its operation and its output a is maintained at "0".

Thereafter, when the notch command 2N is given at time $t_2$ of FIG. 2, the comparator unit 5 detects that the notch command 2N is larger than the output of reversible counter 40, causing the output a of the comparing and identifying circuit 5 to change from "0" to "1". On the other hand, as soon as the NAND gate 42 which has been supplied with the minimum phase signal $\alpha_o$ from the phase detector circuit 3 receives the synchronizing pulse SP, the output b of NAND gate 42 is changed from "1" to "0", thus delivering a countup signal to the reversible counter 40.

Accordingly, at time $t_2$ of FIG. 2, the count content of reversible counter 40 is incresed by one count. This leads to change of the first bit output $O_1$ from "0" to "1", producing the change operation signal $U_{12P}$ for the rectifier unit $U_1$.

The output b of NAND gate 42 is also delivered to the one-shot multivibrator 47, which in turn produces the gate interrupting signal $g_0$ to be delivered to the control input of the phase shifter 2 so as to rapidly return its phase signal $\alpha$ to the maximum phase lag from the minimum phase lag. As seen, as the phase signal is returned to the maximum from the minimum, the output $\alpha_o$ of the phase detector circuit 3 is again changed to "0". The output a of the comparing and identifying circuit is also changed from "1" to "0" to prohibit the counting operation of the reversible counter 40 on the condition that the output of reversible counter 40 coincides with the number represented by notch command of the master controller 1.

Then, the output $\alpha$ of phase shifter 2 which has once been returned to the maximum phase lag is continuously controlled by the separate circuit system between times $t_2$ and $t_3$ of FIG. 2 such that the controllable lag angle $\alpha$ for thyristors 13P and 13N of the rectifier unit $U_1$ changes from the maximum phase lag to the minimum phase lag. When the output $\alpha$ of this phase shifter 2 reaches the minimum, the phase detector 3 again detects the minimum phase lag $\alpha_0$ and delivers the output $\alpha_o$ assuming "1".

Under this condition, when receiving the notch command 3N from the master controller 1, the comparing and identifying unit 5 delivers the output a assuming "1" which again opens the NAND-gate 42 for effecting count-up of the reversible counter 40 so that the count content of the reversible counter 40 is increased by one in synchronism with the synchronizing pulse SP. Thus, the first bit output $O_1$ of reversible counter 40 is changed from "1" to "0" and the second bit output $O_2$ changes from "0" to "1". With the first bit output $O_1$ changes to "0", the operation signal $U_{12P}$ disappears and the unit chaging operation signal $U_{2P}$ for the rectifier unit $U_2$ changes from "0" to "1" thereby to change the number of rectifier units to be operated. Namely, with the notch command 3N, the second and third bit outputs $O_2$ an $O_3$ of the reversible counter 40 to be delivered to the decoder 41 assume "1" and "0", respectively, and hence the outputs $D_1$, $D_2$ and $D_3$ of the decoder 41 respectively assume "0", "1" and "1" as shown in the table. In this manner, only the NAND-gate 60 assumes "1" by receiving the output of the decoder 41, thereby causing the operation signal $U_{2P}$ to assume "1".

On the other hand, concurrently with change in the number of rectifier units to be operated, the output $\alpha$ of the phase shifter 2 is rapidly returned to the maximum phase lag from the minimum phase lag, while the DC output voltage of the rectifier unit $U_1$ is reduced to zero by turning off the thyristors 12P, 12N, 13P and 13N, thereby preventing the DC voltage and current applied to the motor circuit from being suddenly changed.

A similar operation is repeated with the successive notch commands of higher order until the condition at the time $t_9$ of FIG. 2 is reached where all the operation signals $U_{11P}$, $U_{12P}$, $U_{2P}$, $U_{3P}$ and $U_{4P}$ assume "1" so that all the rectifier units are under operation thereby to produce the maximum DC voltage.

In the foregoing description, the notch commands are changed successively one by one by means of the master controller 1. However, the rectifier units are operated in the same manner even when the maximum notch command, i.e., notch command 8N, is given without the steps of giving the intermediate notch commands.

Conversely, when the notch-down operation in which the notch command is changed from higher to lower, the operations at times $t_1$ to $t_9$ are effected reversely.

Obviously, the unit changing control operation as having been described in the foregoing is applicable to a power converter whether it operates in the rectifier mode as mentioned hereinbefore or in the inverter mode.

Figure 5:
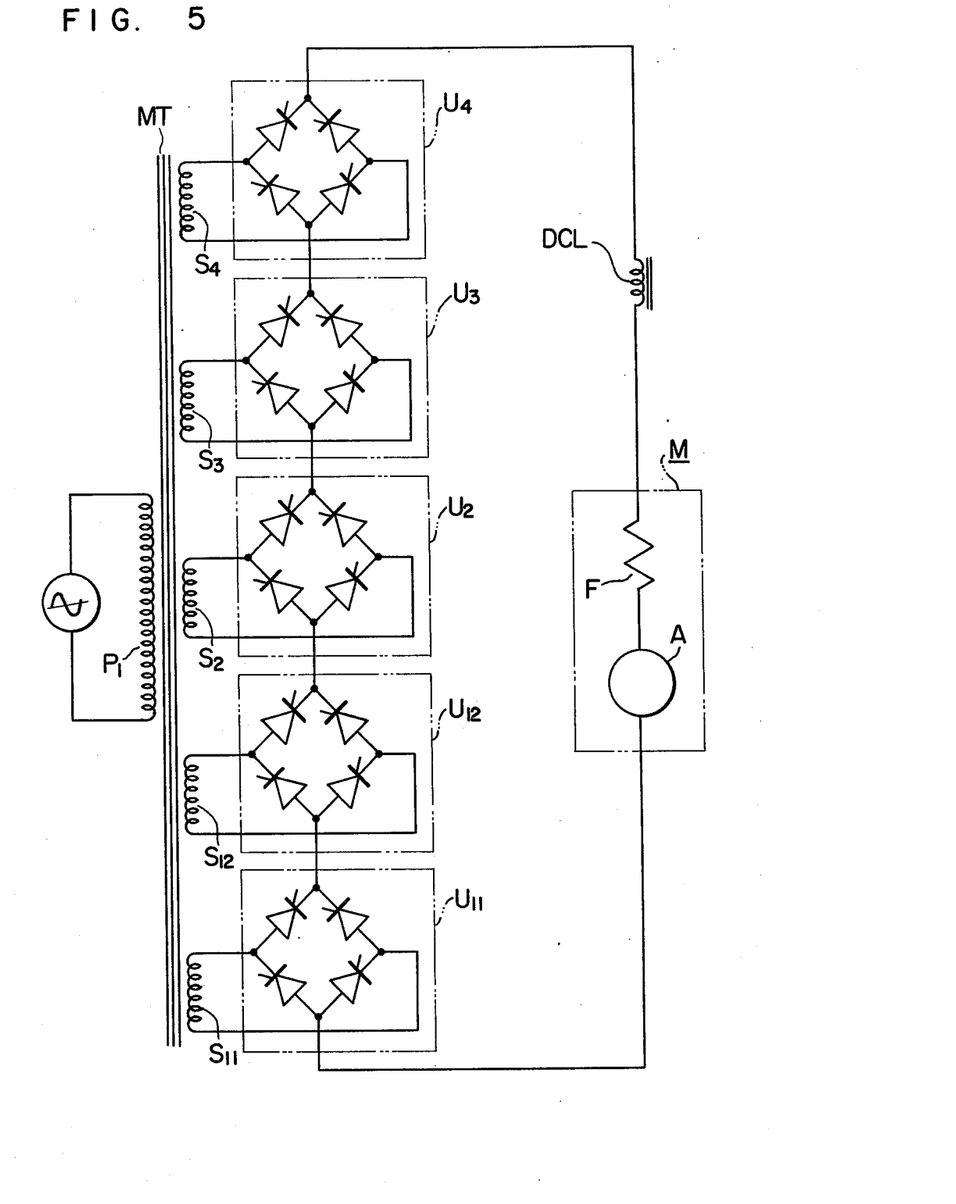
FIG. 5 is a circuit diagram of another example of principal circuit to which the invention is applicable.

Furthermore, the application of the invention is not limited to a power converter of the type as shown in FIG. 1 but the invention is also applicable to a power converter of another type as shown in FIG. 5.

The power converter of FIG. 5 with the same elements as FIG. 1 designated at the same reference numerals differs from the circuit of FIG. 1 in that the continuously controlled rectifier unit $U_1$ is divided into independent single phase bridge circuits $U_{11}$ and $U_{12}$. Voltage division ratios between secondary windings of a main transformer MT are $$S_{11}:S_{12}:S_2:S_3:S_4 = 1:1:2:2:2$$

In such a power converter circuit, the operation signals for rectifier units $U_{11}, U_{12}, U_2, U_3$ and $U_4$ are produced in the same manner as in the operation signals $U_{11P}, U_{12P}, U_{2P}, U_{3P}$ and $U_{4P}$ as illustrated in FIG. 2 and explained with reference to FIG. 3.

Thyristors of both the continuously controlled rectifier units $U_{11}$ and $U_{12}$ may be controlled to have their controllable lag angle continuously changed or, alternatively, one of the rectifier units $U_{11}$ and $U_{12}$ is used as a continuously controlled rectifier unit, while the other rectifier unit as an on-off controlled rectifier unit so that the rectifier units $U_{11}$ and $U_{12}$ are, in combination, served for continuously controlling operation.

As having been described, the invention modifies the outputs of the reversible counter following the second bit through the decoder and uses them as operation signals for on-off controlled rectifier units, thereby providing the improved control system for power converter, which improvement includes reduction in the number of parts and wirings and minimized fabrication time, resulting in a simplified circuit arrangement.

We claim:

1. A control system for use with a power converter including a cascade connection of at least one continuously controlled converter unit whose phase lag in conduction is controlled to continuously change between a maximum phase lag and a minimum phase lag and a plurality of on-off controlled converter units which are subjected to on-off control of conduction, said control system comprising:
    a master controller for producing an output variable depending on and indicative of a number of the convert units to be operated,
    a reversible counter which changes the content of count when said minimum or maximum phase lag is reached by said continuously controlled rectifier unit, said content being represented by a plurality of binary bits.
    a unit change control circuit for applying one of said binary bits of said reversible counter as an operation signal to said continuously controlled converter unit and the remaining bits of said reversible counter as respective operation signals to said on-off controlled converter units, and
    a comparing and identifying circuit means for comparing the content of count of said reversible counter with the output of said master controller and for enabling a counting operation of said reversible counter until the count content of said reversible counter coincides with the output of said master controller.

2. A control system according to claim 1, wherein the count content of said reversible counter increases when the output from said master controller changes from lower to higher one and decreases when said output changes from higher to lower one.

3. A control system according to claim 1, wherein said unit change control circuit includes means for using said one binary bit of said reversible counter, without modification, as said operation signal for operating said continuosly controlled converter unit, and means for decoding said remaining binary bits of said reversible counter to produce said operation signals to be applied to said on-off controlled converter units, respectively, for operating the same.

4. A control system according to claim 1, wherein said unit change control circuit comprises means for prohibiting the count content of said reversible counter from being changed when the output of said master controller coincides with the count content of said reversible counter.

5. A control system according to claim 1, wherein said converter units are rectifier units, respectively.

* * * * *